United States Patent
Kwa et al.

(10) Patent No.: US 8,371,160 B2
(45) Date of Patent: Feb. 12, 2013

(54) WEATHERIZED DIRECT-MOUNT ABSOLUTE PRESSURE SENSOR

(75) Inventors: Tom Kwa, San Jose, CA (US); Don L. Danielson, Palo Alto, CA (US)

(73) Assignee: Meggitt (San Juan Capistrano), Inc., San Juan Capistrano, CA (US)

( * ) Notice: Subject to any disclaimer, the term of this patent is extended or adjusted under 35 U.S.C. 154(b) by 642 days.

(21) Appl. No.: 12/639,665

(22) Filed: Dec. 16, 2009

(65) Prior Publication Data

US 2011/0138900 A1  Jun. 16, 2011

(51) Int. Cl.
*G01M 9/00* (2006.01)

(52) U.S. Cl. ............... 73/147; 73/700; 73/715; 73/721

(58) Field of Classification Search .................. None
See application file for complete search history.

(56) References Cited

U.S. PATENT DOCUMENTS

| | | | |
|---|---|---|---|
| 4,093,933 A | 6/1978 | Wilner | 338/42 |
| 4,727,751 A | 3/1988 | Holmes et al. | 73/147 |
| 5,272,915 A | 12/1993 | Gelbach et al. | 73/147 |
| 5,509,312 A | 4/1996 | Donzier et al. | |
| 5,606,136 A * | 2/1997 | Kropp | 73/862.046 |
| 5,874,671 A * | 2/1999 | Lopez | 73/147 |
| 5,895,866 A * | 4/1999 | Neukermans et al. | 73/861.74 |
| 5,918,263 A * | 6/1999 | Thundat | 73/35.16 |
| 5,973,590 A * | 10/1999 | Kurtz et al. | 338/42 |
| 6,006,607 A | 12/1999 | Bryzek et al. | |
| 6,236,095 B1 * | 5/2001 | Caldwell | 257/419 |
| 6,401,542 B1 | 6/2002 | Kato | |
| 6,591,696 B2 * | 7/2003 | Bachinski | 73/861.65 |
| 7,509,869 B2 * | 3/2009 | Liu et al. | 73/756 |
| 7,716,984 B2 * | 5/2010 | Sakaguchi | 73/514.33 |
| 7,775,084 B2 * | 8/2010 | Huq et al. | 73/54.27 |
| 7,868,749 B2 * | 1/2011 | Miyamoto et al. | 340/444 |
| 8,069,730 B2 * | 12/2011 | Kurtz et al. | 73/727 |
| 2004/0094733 A1 * | 5/2004 | Hower et al. | 251/11 |
| 2007/0022825 A1 * | 2/2007 | Samms et al. | 73/861.19 |
| 2007/0212818 A1 | 9/2007 | Kwa | 438/113 |

\* cited by examiner

*Primary Examiner* — Lisa Caputo
*Assistant Examiner* — Jermaine Jenkins
(74) *Attorney, Agent, or Firm* — Paul Davis; Goodwin Procter LLP (57) ABSTRACT

A piezoresistive sensor assembly is provided that has a flex circuit having at least one air flow aperture formed therein. A sensor die is coupled to an absolute support and the flex circuit. The sensor die has a diaphragm that deflects in response to air flow that flows through the air flow aperture and is incident on the diaphragm. The sensor die includes one or more gages positioned on or in the diaphragm.

28 Claims, 8 Drawing Sheets

WEATHERIZED DIRECT-MOUNT ABSOLUTE PRESSURE SENSOR

BACKGROUND

1. Field of the Invention

The present invention relates generally to piezoresistive sensors, and more particularly to piezoresistive sensors for determining airflow conditions on an aircraft wing.

2. Description of the Related Art

The study of airflow characteristics is an important part of basic aeronautical research and design. Air passing over a flight surface, such as a wing, is either laminar, transitional, or turbulent in nature. Air that flows smoothly in a continuous stream is laminar, while an airstream that is rough or broken is turbulent. Transitional airflow, as the name implies, alternates between laminar and turbulent conditions. As the airflow over an aircraft wing becomes turbulent, the fuel efficiency of the aircraft decreases. Therefore, in order to achieve maximum fuel efficiency of an aircraft, it is necessary that the airflow be laminar over as much of the wing surface as possible. Modern aircraft designers are currently experimenting with ways to alter the airflow patterns over an aircraft's wings while in flight in order to increase fuel efficiency. If these methods prove successful, pilots will be provided with controls or automated systems that alter the airflow over the wings to maintain maximum fuel efficiency in any given flight situation.

One way of measuring the characteristics of airflow over a wing is by using a hot-film sensor as disclosed in U.S. Pat. No. 4,727,751. This method involves placing a plurality of hot-film sensors at various locations on the wing and measuring the heat transfer from the sensors to the airstream as they are exposed to laminar, transitional or turbulent airflow. Such hot-film sensors are coupled to an anemometer circuit, which drives them to a constant temperature with a feedback circuit or excites them with a constant current.

Measuring the pressure distribution at the front point of the wing facing the airflow can also be carried out by pressure sensors integrated in the surface. This technique provides the advantage that it does not increase the overall resistance of the aircraft. This type of measuring sensor, however, does pose the danger that measurements may effectively be changed as a result of, for example, ice formation, dirt or bird strike. Consequently, pressure measurements are considerably affected or even impossible, which may lead to total failure of at least individual sensors and even of the air data system.

Pressure load surveys during flight testing require large numbers of pressure measurements distributed across the wing and or body of the plane. Pressure Belts™ have been used for a large number of channels of pressure measurements during a single flight test. Flush ports have also been used where tubing is plumbed from the flush port, a small hole drilled into the body of the plane, to a pressure scanner that may be located a fair distance away. This type of installation is expensive and sometimes requires the use of sacrificial wing parts that significantly raise the cost of the measurements. The tube length needed to connect the port to the scanner causes signal delay and limits dynamic response.

Pressure Belts cannot be used to replace most flush ports. A Pressure Belt cannot be bent around the leading edge or the trailing edge or the tip of a wing. If the Pressure Belt could be bent, it would create perturbation to airflow which corrupts the aerodynamic data.

SUMMARY

Accordingly, an object of the present invention is to provide a sensor system suitable for measuring the airflow around the leading edge or the trailing edge or the tip, of an aircraft wing.

Another object of the present invention is to provide a sensor system that measures airflow at the front point or the rear point or the tip of the wing facing the airflow with minimal disruption to the wing.

Yet another object of the present invention is to provide a sensor system that measures airflow at the leading edge or the trailing edge or the tip of an aircraft wing that minimizes overall resistance of the aircraft.

A further object of the present invention is to provide a sensor system that measures airflow at the leading edge or the trailing edge or the tip of an aircraft wing but does not disturb the airflow.

Another object of the present invention is to provide a sensor system that measures airflow at the leading edge or the trailing edge or the tip of an aircraft wing which eliminates the need for flush port installations.

These and other objects of the present invention are achieved in a piezoresistive sensor assembly with a flex circuit having at least one airflow aperture formed therein. A sensor die is coupled to an absolute support and the flex circuit. The sensor die has a diaphragm that deflects in response to airflow that flows through the airflow aperture and is incident on the diaphragm. The sensor die includes one or more gages positioned on or in the diaphragm.

In another embodiment of the present invention, a piezoresistive sensor assembly is provided that has a flex circuit coupled to a gage support. At least one airflow aperture is formed in the flex circuit and the gage support. A sensor die is coupled to an absolute support and the gage support. The sensor die has a diaphragm that deflects in response to airflow that flows through the airflow aperture and is incident on the diaphragm. The sensor die includes one or more gages positioned on or in the diaphragm.

In another embodiment of the present invention, a method is provided for measuring airflow on a rim face of an aircraft wing that directly faces airflow. A piezoresistive sensor assembly is coupled to a rim face of the aircraft wing. The piezoresistive sensor includes, a flex circuit having at least one airflow aperture formed therein, an absolute support, and a sensor die coupled to the absolute support. The sensor die has a diaphragm; Airflow passes through the aperture and is incident on the diaphragm. The diaphragm deflects in response to the airflow incident on the diaphragm. An output signal is generated that is an indication of the amount of deflection.

In another embodiment of the present invention, a method is provided for measuring airflow on a rim face of an aircraft wing that directly faces airflow. A piezoresistive sensor assembly is coupled to a rim face of the aircraft wing. The piezoresistive sensor includes, a flex circuit, a gage support with at least one airflow aperture formed in the flex circuit and the gage support, an absolute support, and a sensor die coupled to the absolute support. The sensor die has a diaphragm; Airflow passes through the aperture and is incident on the diaphragm. The diaphragm deflects in response to the airflow incident on the diaphragm. An output signal is generated that is an indication of the amount of deflection.

DETAILED DESCRIPTION

In one embodiment, the present invention is a piezoresistive sensor assembly that has a flex circuit with an airflow aperture, a gage support, a sensor die and an absolute support. A piezoresistive sensor includes a diaphragm that deflects in response to pressure. The piezoresistive sensor includes a strain-sensitive element positioned on or in the diaphragm, the piezoresistive sensor being positioned and coupled to the flex circuit.

In another embodiment, a piezoresistive sensor assembly is provided with a gage support coupled to the sensor die and the flex circuit.

Figure 1:
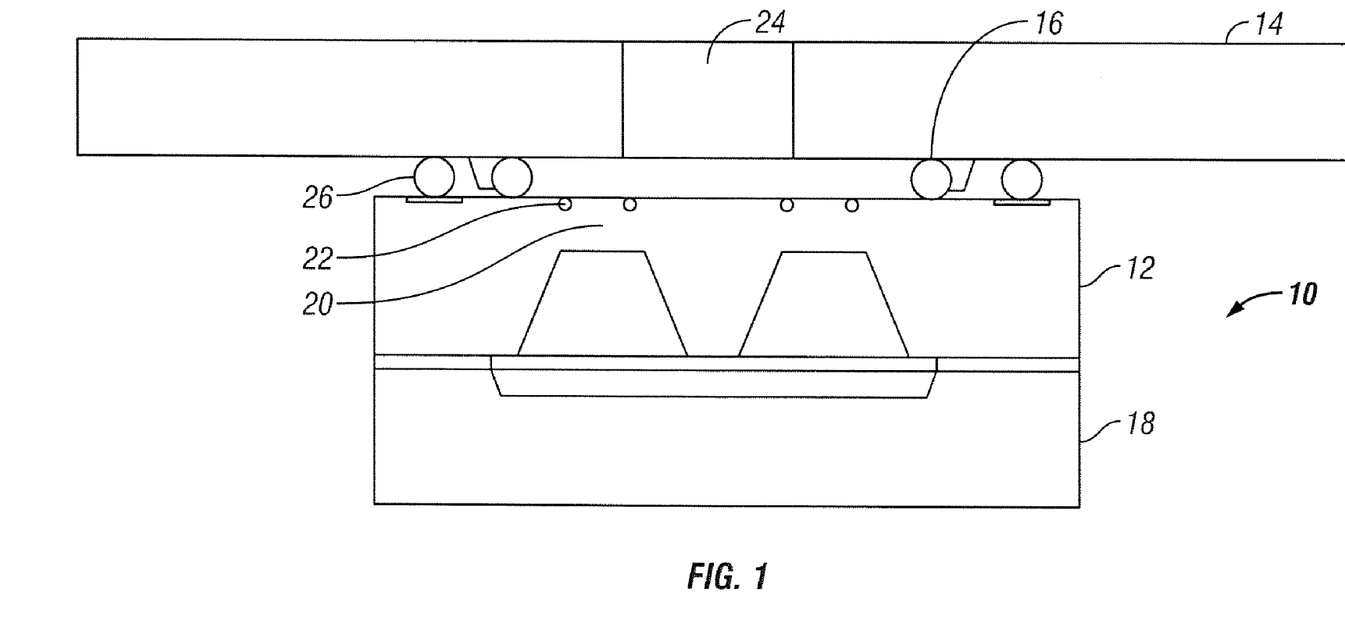
FIG. 1 illustrates an embodiment of the present invention with a flex circuit that has an aperture formed there-through, an absolute support, and a sensor die with a diaphragm in airflow communication with the aperture.

Referring now to FIG. 1, one embodiment of the present invention provides a piezoresistive sensor assembly, generally denoted as 10, that includes a sensor die 12 bonded to one or more flex circuits 14 with a non-conductive adhesive 16 or other element that couples the two. In one embodiment, the adhesive 16 is an epoxy ring. An absolute support 18 is coupled to an opposing side of the piezoresistive die 12. The absolute support 18 can be coupled to the sensor die 12 by a variety of means known in the art.

The piezoresistive die 12 includes a diaphragm 20 with piezoresistive elements, gages 22, in or on a diaphragm surface, electrical leads, a dielectric layer, electrical-contact windows and the like. A suitable piezoresistive die, excluding the electrical leads, is disclosed in U.S. Pat. No. 4,093,933, fully incorporated herein by reference. As a non-limiting example, the gages 22 are small and can be about 300 um×5 um.

Figure 2:
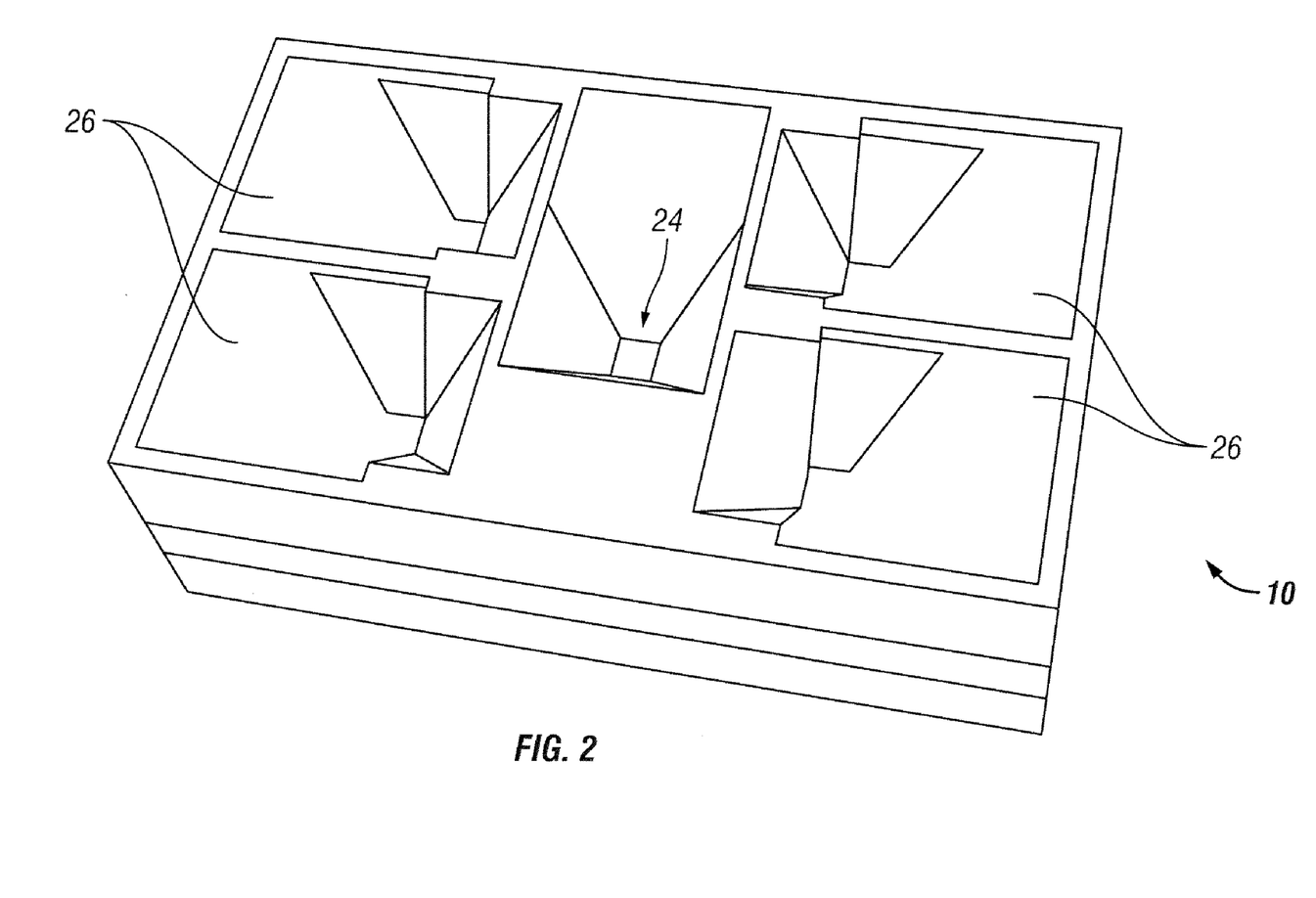
FIG. 2 illustrates top down view of the FIG. 1 embodiment with the flex circuit removed, illustrates a plurality of connectors.

The flex circuit 14 includes a substrate, a plurality of conductors and one or more apertures 24 that allows for passage of air that is incident on the diaphragm 20. The non-conductive adhesive prevents air from flowing through the one or more apertures 24 to areas other than the diaphragm 20. A plurality of conductors 26, illustrated in FIG. 2, are in or on the surface of the flex circuit 14 and connect the sensor die 12 to signal conditioning electronics. The conductors 26 can be a conductive adhesive. In one embodiment, four conductive epoxy conductors are provided. The conductors 26 bring signals in and out of the diaphragm 20 and gages 22 from the sensor die's conductors. As a non-limiting example, the conductors 26 can have sizes of about 250 um in diameter.

Conductors are also in or on the sensor die 12 and are coupled to the conductors 26. The flex circuit 14 can be routed to signal conditioning modules to form part of a distributed network bus.

The diaphragm 20 deflects in response to airflow pressure that flows through the one or more apertures 24 and provides a signal that is processed by the signal conditioning electronics. The position of the diaphragm 20 is important in order to measure airflow on a rim face of an aircraft wing that directly faces air-flow. With the diaphragm 20 so positioned, the piezoresistive die 12 does not disturb air flow incident on the front edge or the leading edge section of the wing surface. Absolute pressure measurement is implemented with the use of the absolute support 18.

Figure 3:
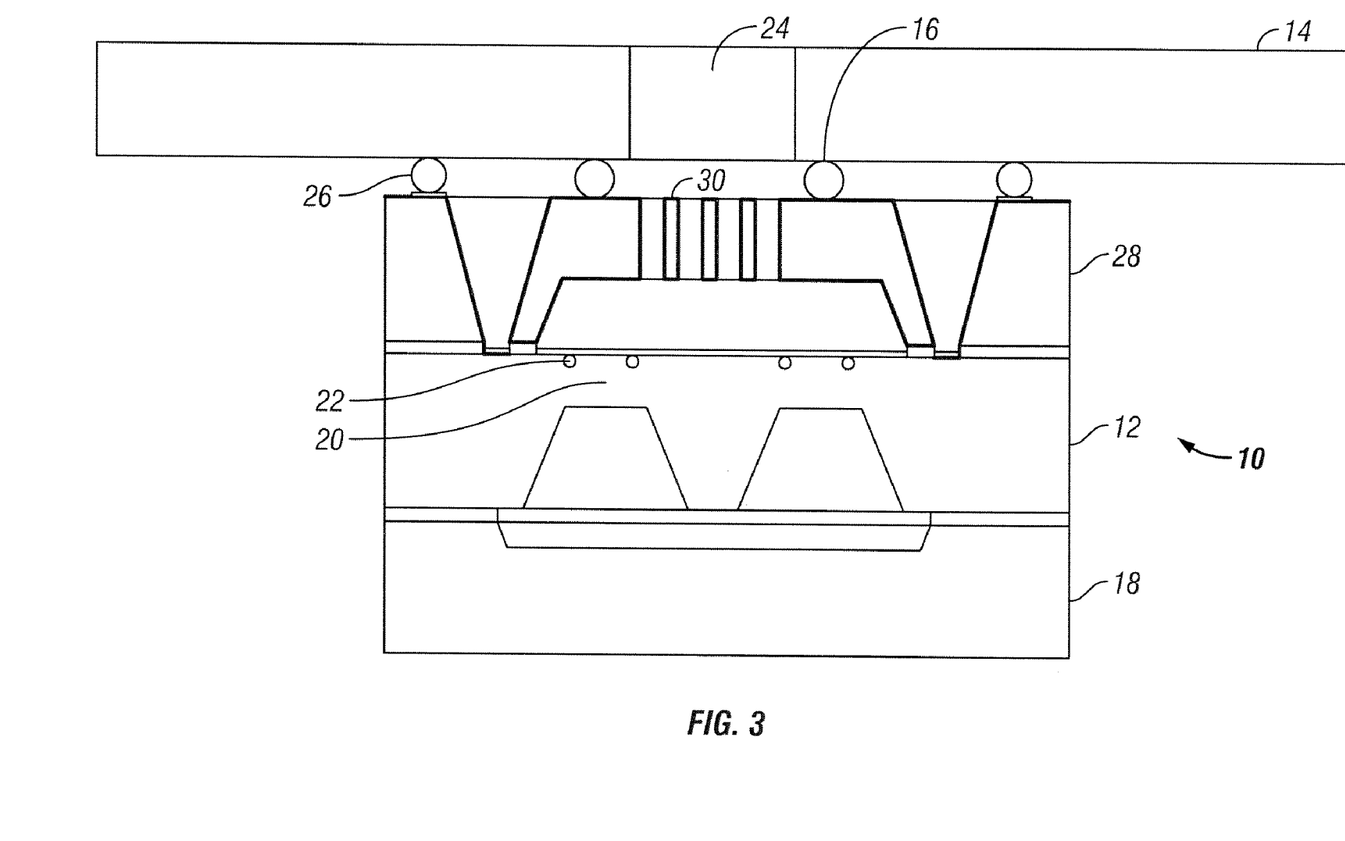
FIG. 3 illustrates an embodiment of the present invention, similar to that of FIG. 1, and further includes a gage support positioned between the flex support and the sensor die.

In another embodiment of the present invention, illustrated in FIG. 3, a gage support 28 is coupled to the sensor die 12 and the flex support 14. The one or more apertures 24 extend through the flex support 14 and the gage support. In this embodiment, the conductive adhesive 26 is on a top surface of the gage support 28.

In one embodiment, illustrated in FIG. 3, apertures 24 are formed in the flex circuit 14, or more preferably in the gage support 28, in a screen or mesh type of arrangement 30. The mesh provides a reduction in dirt or moisture from to reach the sensor die 12, and more particularly the diaphragm 20. As a non-limiting example, the size of the mesh can be about 20 microns diameter per aperture in a range of about 5 um to 1000 um. It is preferred that the size be sufficiently small to allow airflow to be incident on the diaphragm and yet minimize moisture or dirt on the sensor 12. On the lower end, the size is limited by the etch process used. On the higher end, it is dictated by the size of the sensor die 12.

Figure 4:
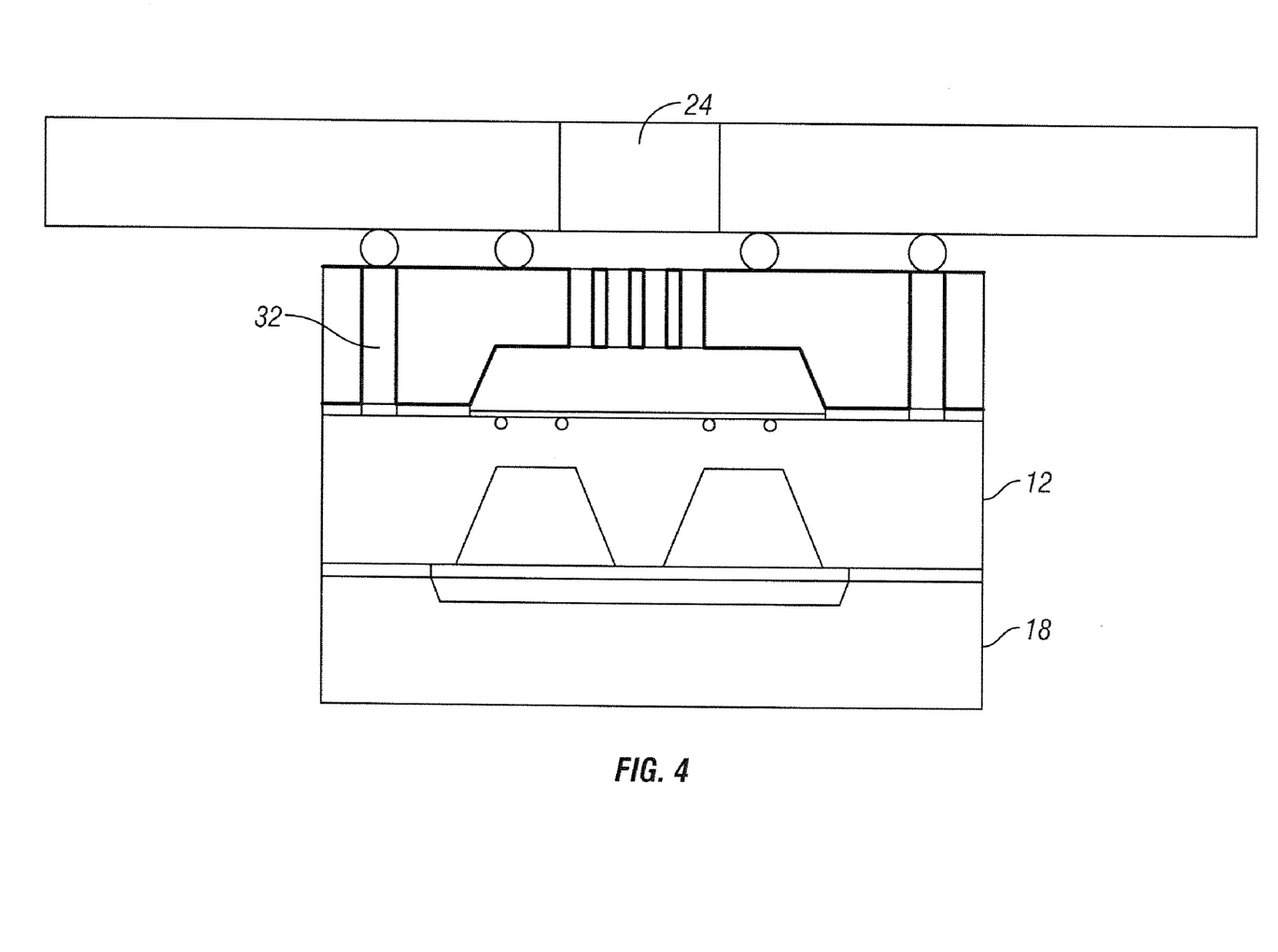
FIG. 4 illustrates an embodiment of the present invention, similar to the one of FIG. 3, but made with through-vias.
Figure 5:
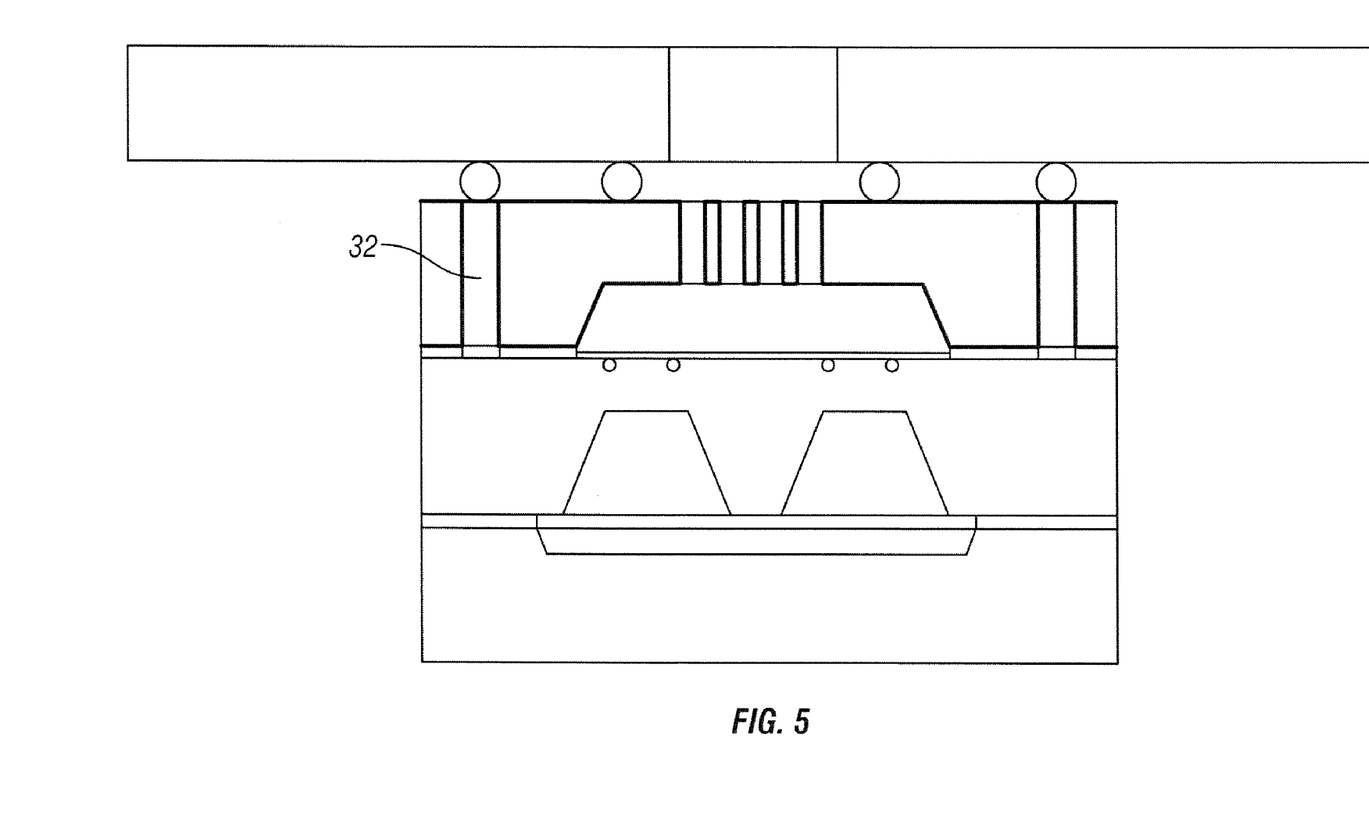
FIG. 5 illustrates an embodiment of the present invention, similar to the one of FIG. 4, but with different through-vias.

In another embodiment, through-vias 32 are made, illustrated in FIGS. 4 and 5, and as disclosed in U.S. Publication No. 2007/0212818 which is fully incorporated herein by reference.

Figure 6:
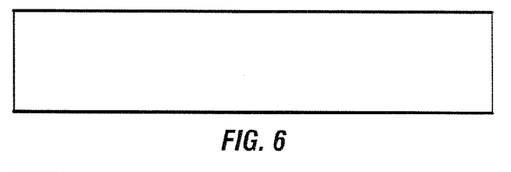
FIGS. 6-14 illustrates an embodiment of the present invention, for creating the mesh structure in an embodiment of the present invention.
Figure 7:
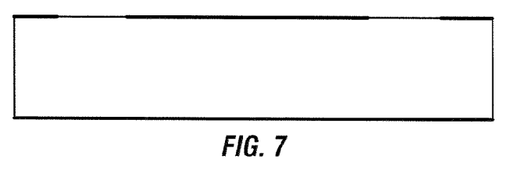
Figure 8:
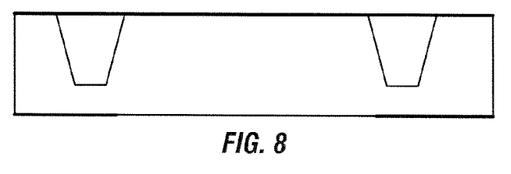
Figure 9:
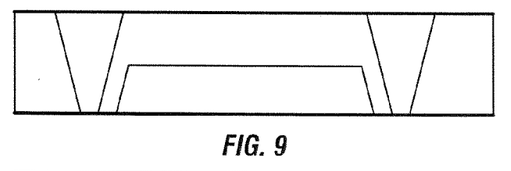
Figure 10:
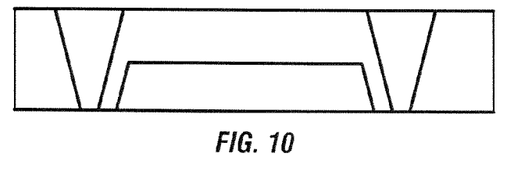
Figure 11:
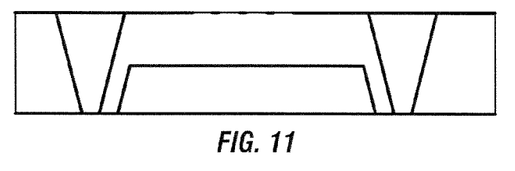
Figure 12:
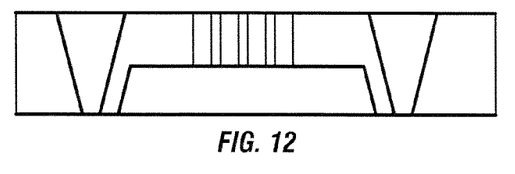
Figure 13:
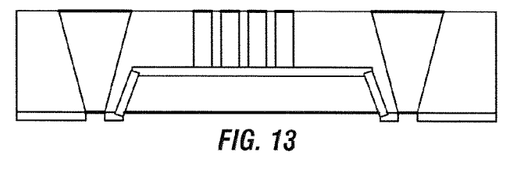
Figure 14:
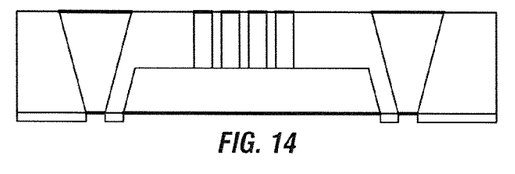

FIGS. 6-14 illustrate formation of the gage support 28 having a mesh 30, beginning with a blank wafer in FIG. 6. The blank wafer is first oxidized and the oxide is then patterned, FIG. 7, and the wafer is etched to form through-holes, FIG. 8. The wafer is then patterned and etched on the opposite site as shown in FIG. 9 to complete the through-holes and to create a chamber in the second side of the wafer. As illustrated in FIG. 10, the oxide is stripped and re-grown. The oxide is then patterned in FIG. 11 on the top side to create the mesh structure. As illustrated in FIG. 12, a Deep Reactive-Ion Etch (DRIE) is performed. The order of mesh formation and chamber formation can also be reversed. In FIG. 13, solder glass is then deposited. The solder glass is patterned, as illustrated in FIG. 14.

The gage support 28 is then bonded to the sensor die 12, and the sensor die 12 is bonded to the absolute support 18. The three wafers are aligned to each other and while pressure is applied, the wafer stack is subjected to heat to melt the solder glass so as to bond the three wafers. Other bonding techniques may be applicable as well.

Figure 15:
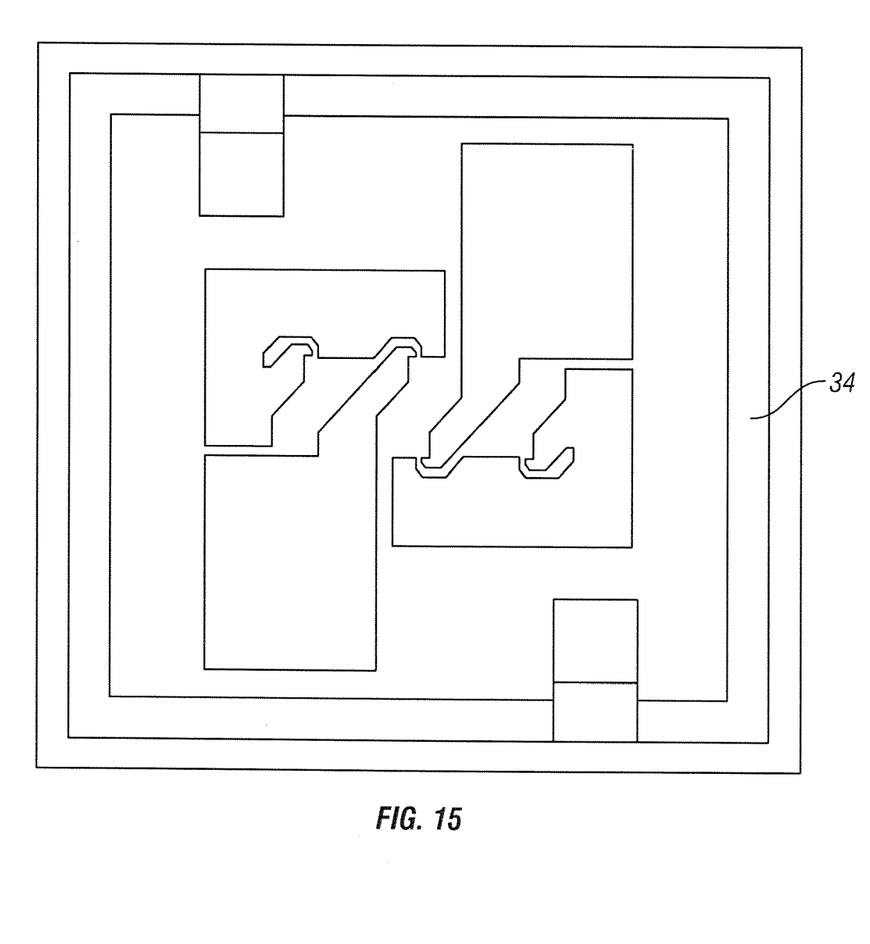
FIG. 15 illustrates a heating element coupled to the sensor die in an embodiment of the present invention.

In another embodiment of the present invention, illustrated in FIG. 15, one or more heating elements 34, including but not limited to resistive heaters, are included in the sensor die 12. The heating elements are used to vaporize moisture. In one embodiment, a heating element 34 is a resistor laid out around a perimeter of the sensor die 12, at the footprint. In this embodiment, the heating element 34 is built into the sensor die 12 at the same time as the diffusion to form the electrical leads to the gages and there is no additional processing required to form the heating element.

Figure 16:
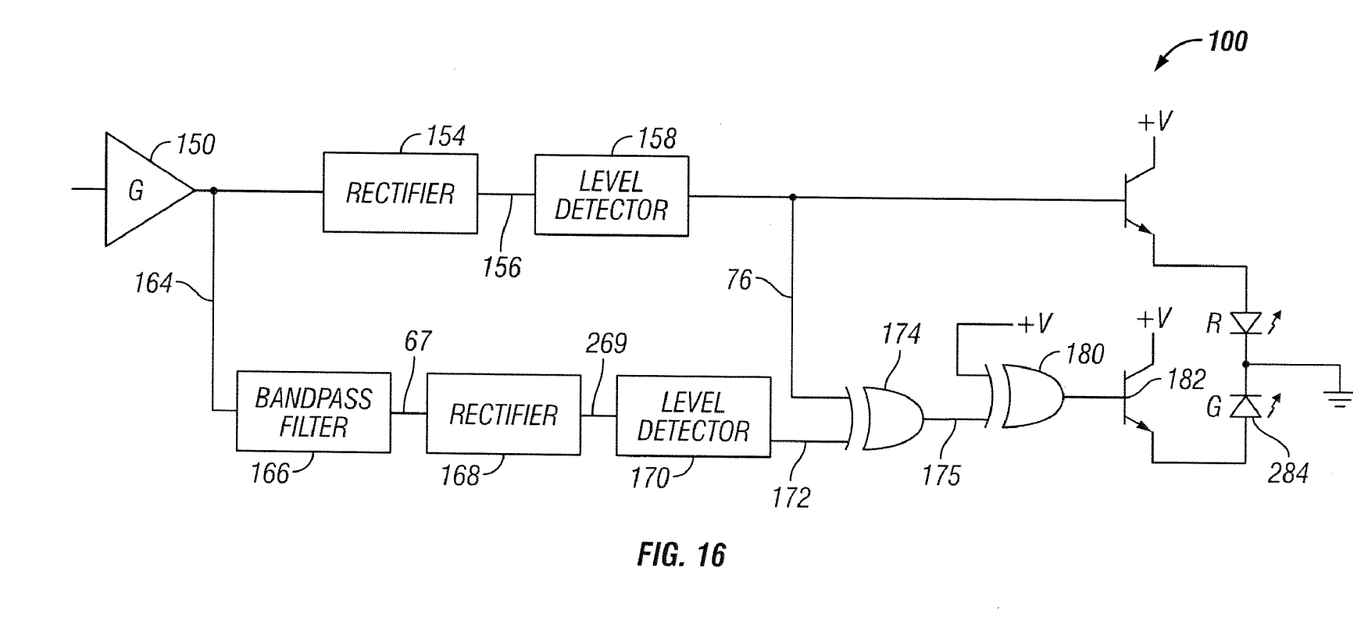
FIG. 16 is a block diagram of a signal processing circuit that can be used with the present invention.

As disclosed in U.S. Pat. No. 5,272,915, FIG. 16 shows a block diagram of a signal processing circuit 100 can be used with system 10. In this embodiment, an amplifier 150 is provided. The amplifier 150 receives an output signal. The output of amplifier 150 is rectified by a rectifier 154 and the resulting signal is connected to a level detector 158 by a lead 156.

Also connected to the output of amplifier 150 by a lead 164 is a bandpass filter 166. The output of bandpass filter 166 is connected by a lead 167 to a second rectifier 168. The output of rectifier 68 is connected by a lead 69 to a second level detector 170. Level detector 70 compares the level of the signal on lead 169 with a second predetermined threshold. If the level of the signal on lead 169 is greater than the second predetermined threshold, the level detector 170 applies a logic high signal (i.e., a digital binary "one") on a lead 172 signal to an "exclusive OR" (XOR) gate 174.

Also connected to a pin input of XOR gate 174 on the lead 176 is output signal of level detector 158. An output lead 175 of XOR gate 174 carries a logic high signal if the signal on only one of leads 176 or 172 is a logic high. However, if the signal on leads 172 and 176 have the same logic level, i.e., both logic high or both logic low, then the output of XOR gate 174 is logic low. Connected to the output lead 175 of XOR gate 174 is one input of a second XOR gate 180. A second input pin of XOR gate 180 is tied to a logic high level. If the output of XOR gate 180 is logic high (which occurs only when the output of XOR gate 174 is logic low), a second transistor 182 is turned on, providing current to turn on a green LED 84, indicating laminar airflow over sensor 120.

The signal processing circuit of provides an indication if the signal on lead 164 is less than both the first and second predetermined thresholds. Such a signal is indicative of laminar airflow. Airflow is detected when the signal has a large amplitude, i.e., larger than the first predetermined threshold, but relatively little energy in the frequency range of 50-80 Hz.

Example 1

The gage support 28 of the pressure sensor 10 was made as follows. A blank wafer of material was provided. Suitable wafer materials include but are not limited to silicon, silicon-on-insulator, silicon carbide silicon-on-saffire The wafer was oxidized in a gas mixture including oxygen and hydrogen, at 1000 to 1200° C., and then patterned using hydrofluoric acid. The silicon is etched on the opposite site of the wafer to form through holes with dimensions of 500 um×500 um. A chamber is created in the second side of the wafer. The wafer is stripped in hydrofluoric acid, and oxides are re-grown at 1000 to 1200° C. The oxide is then patterned using a Reactive Ion Etch (RIE) to create the mesh structure that is dimensioned 20 um-diameter circles, but can also be squares or other shapes. A Deep Reaction-Ion Etch is performed. Solder glass is then deposited. The solder glass is patterned. This bonds the solder glass to the pressure sensor.

While the invention has been particularly shown and described with references to preferred embodiments thereof, it will be understood by those skilled in the art that various changes in form and details may be made therein without departing from the scope of the invention encompassed by the appended claims.

The invention claimed is:

1. A piezoresistive sensor assembly, comprising:
a flex circuit having at least one air flow aperture formed therein;
an absolute support;
a sensor die coupled to the absolute support and the flex circuit, the sensor die having a diaphragm that deflects in response to air flow that flows through the air flow aperture and is incident on the diaphragm, the sensor die including one or more gages positioned on or in the diaphragm; and
one or more heating elements built into the sensor die wherein the one or more heating elements are used to vaporize moisture entering the sensor die.

2. The assembly of claim 1, wherein the air flow aperture is defined by a plurality of small apertures formed in the flex circuit.

3. The assembly of claim 1, wherein the air flow aperture is defined by a mesh that includes a plurality of apertures formed in the flex circuit.

4. The assembly of claim 3, wherein sizes of apertures of the mesh are selected to reduce an amount of contaminant and moisture collected on the diaphragm.

5. The assembly of claim 1, wherein the heating element is formed at a periphery of the sensor die.

6. The assembly of claim 1, further comprising:
a non-conductive adhesive that couples the flex circuit to the sensor die.

7. The assembly of claim 1, further comprising:
a conductive adhesive coupled to conductors at the sensor die.

8. The assembly of claim 1, a plurality of conductors at the flex circuit and coupled to a plurality of conductors at the sensor die.

9. The assembly of claim 1, further comprising:
a feedback circuit coupled to the piezoresistive sensor that produces an output signal indicative of a change in pressure at the diaphragm.

10. The assembly of claim 9, further comprising:
a signal processing circuit coupled to the feedback circuit for processing an output signal and determine airflow relative to a wing of an aircraft.

11. A piezoresistive sensor assembly, comprising:
a flex circuit;
a gage support coupled to the flex circuit, the flex circuit and gage support having at least one air flow aperture formed therein;
an absolute support;
a sensor die coupled to the absolute support, the sensor die having a diaphragm that deflects in response to air flow that flows through the air flow aperture and is incident on the diaphragm, the sensor die including one or more gages positioned on or in the diaphragm; and
one or more heating elements built into the sensor die wherein the one or more heating elements are used to vaporize moisture entering the sensor die.

12. The assembly of claim 11, wherein the air flow aperture in the gage support is defined by a plurality of small apertures formed in the gage support.

13. The assembly of claim 11, wherein the air flow aperture in the flex circuit is defined by a plurality of small apertures formed in the flex circuit.

14. The assembly of claim 11, wherein the air flow aperture defined by a mesh that includes a plurality of apertures formed in the flex circuit.

15. The assembly of claim 14, wherein sizes of apertures of the mesh are selected to reduce an amount of contaminant and moisture collected on the diaphragm.

16. The assembly of claim 15, wherein the heating element is formed at a periphery of the sensor die.

17. The assembly of claim 11, further comprising:
one or more heating elements associated with the piezoresistive sensor.

18. The assembly of claim 11, further comprising:
a non-conductive adhesive that couples the flex circuit to the gage support.

19. The assembly of claim 11, further comprising:
a conductive adhesive coupled to conductors at the sensor die.

20. The assembly of claim 11, a plurality of conductors at the flex circuit and coupled to a plurality of conductors at the sensor die.

21. The assembly of claim 11, further comprising:
a feedback circuit coupled to the piezoresistive sensor that produces an output signal indicative of a change in pressure at the diaphragm.

22. The assembly of claim 21, further comprising:
a signal processing circuit coupled to the feedback circuit for processing an output signal and determine airflow relative to a wing of an aircraft.

23. A method for measuring airflow on a rim face of an aircraft wing that directly faces air-flow, comprising:
coupling a piezoresistive sensor assembly to a rim face of the aircraft wing, the piezoresistive sensor including, a flex circuit having at least one air flow aperture formed therein, an absolute support, and a sensor die coupled to the absolute support, the sensor die having a diaphragm;
having air flow to pass through the aperture and be incident on the diaphragm;
permitting the diaphragm to deflect in response to the air flow incident on the diaphragm;
generating an output signal indication of the amount of deflection; and
building one or more heating elements into the sensor die wherein the one or more heating elements are used to vaporize moisture entering the sensor die.

24. The method of claim 23, further comprising:
processing the output signal; and
in response to the processing of the output signal, determining airflow of the rim face of the aircraft wing.

25. The method of claim 23, wherein the position of the diaphragm does not disturb air flow incident on the rim face of the aircraft wing.

26. A method for measuring airflow on a rim face of an aircraft wing that directly faces air-flow, comprising:
coupling a piezoresistive sensor assembly to a rim face of the aircraft wing, the piezoresistive sensor including, a flex circuit, a gage support coupled to the flex circuit with at least one air flow aperture formed in the flex circuit and the gage support, an absolute support, and a sensor die coupled to the absolute support, the sensor die having a diaphragm;
having air flow to pass through the aperture and be incident on the diaphragm;
permitting the diaphragm to deflect in response to the air flow incident on the diaphragm; and
generating an output signal indication of the amount of deflection; and
building one or more heating elements into the sensor die wherein the one or more heating elements are used to vaporize moisture entering the sensor die.

27. The method of claim 26, further comprising:
processing the output signal; and
in response to the processing of the output signal, determining airflow of the rim face of the aircraft wing.

28. The method of claim 26, wherein the position of the diaphragm does not disturb air flow incident on the rim face of the aircraft wing.

* * * * *